United States Patent Office 2,962,464
Patented Nov. 29, 1960

2,962,464

STABLE FLAMEPROOF POLYETHYLENE COMPOSITION

George B. Feild, New Castle, Del., assignor to Hercules Powder Company, Wilmington, Del., a corporation of Delaware No Drawing. Filed Dec. 30, 1958, Ser. No. 783,678

2 Claims. (Cl. 260—28.5)

The present invention relates to flameproof compositions of a normally inflammable polymeric thermoplastic material. More particularly, the invention relates to a composition comprising a normally inflammable thermoplastic polymeric material and minor amounts of ingredients to render said polymeric material flame-proof without loss of heat stability.

It is well-recognized that many polymeric thermoplastic materials are normally inflammable and because of this their use in applications where fire is a hazard is limited. The art, in order to overcome this limitation, has devised numerous methods of rendering such thermoplastic materials flameproof, these methods involving the incorporation into the thermoplastic material of ingredients which render it flameproof. A particularly preferred and, in fact, commercially used method is that described in U.S. Patent 2,669,521 to Lester A. Bierly, dated February 16, 1954, wherein normally inflammable polymeric thermoplastic materials are rendered non-inflammable by the incorporation of minor amounts of chlorinated hydrocarbons, particularly chlorinated paraffin wax containing between 50–80% of chemically combined chlorine, and also an inorganic flame retardant substance, preferably antimony oxide. The compositions of that patent possess satisfactory flame resistance but suffer, however, from appreciable discoloration and degradation when subjected to high temperatures such as may be encountered in injection molding. This latter fact is recognized by Rugar in U.S. Patent 2,590,211, dated March 25, 1952, and, to overcome the deficiency, Rugar prescribes the further addition to the flameproof composition of a stabilizing component such as an alkylene or arylene oxide, an alkaline earth metal salt of a fatty acid or a tetraaryl or tetraalkyl substituted compound of tin. Another prior art stabilizer for chlorinated organic materials is basic lead silicate sulfate, sold commercially as Tribase E. While the above stabilizers do have some ability to prevent degradation, they are not particularly effective at temperatures above about 300° F.

The present invention is based on the discovery that pentaerythritol is an especially effective heat stabilizer for flameproof compositions comprising normally inflammable polymeric thermoplastic material, chlorinated paraffin wax and antimony oxide, a role in which the pentaerythritol in some way coacts with the antimony oxide to bring about the desired degree of stability.

It has, of course, previously been proposed to employ pentaerythritol as a stabilizer for chlorinated paraffin wax, as described in U.S. Patent 2,722,557 to Danison dated November 1, 1955, but pentaerythritol has not shown sufficient stabilizing stability in this use to have achieved recognition in the art. In fact, when chlorinated paraffin wax stabilized with pentaerythritol is employed in the flameproofing of a polymeric thermoplastic material the resulting composition has relatively poor stability in the absence of antimony oxide. It is, in fact, the basic discovery of the present invention that when pentaerythritol and antimony oxide are present together in a flameproof composition of the type described in U.S. 2,722,557 that a much higher degree of stability is obtained than when pentaerythritol alone is present.

Describing the invention more specifically, there is provided a heat stable flameproof composition comprising at least 50% of a normally inflammable polymeric thermoplastic material, at least 15% together of antimony oxide and chlorinated paraffin wax having from 50–80% chemically combined chlorine and at least about 0.1% by weight of pentaerythritol.

The following examples are presented for the purpose of illustrating the invention. Parts and percentages are by weight throughout the specification unless otherwise specified.

The molecular weight of the polyethylene referred to in the examples is measured by reduced specific viscosity value (RSV) by which is meant the specific viscosity, corrected to zero shear gradient, divided by the concentration of the solution in grams per hundred milliliters measured at 135° C. on a solution in "decahydronaphthalene" containing 0.1 grams of the polyethylene in 100 milliliters of solution.

EXAMPLE 1

Compositions of the formulations given in the following table were prepared by milling the specified ingredients on a two-roll mill at 275° F.

*Table I*

| Component | Composition—Parts | | |
|---|---|---|---|
| | A | B | C |
| Linear Polyethylene (RSV=1.92—Melt Index=1.14) | 67.8 | 67.8 | 67.8 |
| Chlorinated Paraffin Wax (69.6% combined chlorine) | 10.8 | 10.8 | 10.8 |
| Antimony Trioxide | 21.4 | 21.4 | 21.4 |
| Pentaerythritol | 1.75 | 0 | 0 |
| Tribase E (basic lead silicate sulfate) | 0 | 1.0 | 0 |

Samples of each of the above compositions were next evaluated for heat stability in a 4-ounce Reed-Prentice injection molding machine. In this evaluation the fill point cylinder temperature was first determined employing a plaque (5" x 5" x ⅛") cavity while maintaining the following condition constant:

Mold temperature, ° F _____ 140
Cycle, seconds _____ 20–15–3
Booster, seconds _____ 0
Pressure, gauge _____ p.s.i. _ 900

If in cases the fill temperature was about 290° F., the cylinder temperature was then raised in increments of 50° F. while observing the molded specimens for evidence of degradation. The following are notations on the behavior of each composition:

*Composition A.*—Only very slight discoloration noted at temperature 100° F. above fill point. Only slight to moderate discoloration at 150° F. above fill point.

*Composition B.*—Slight to moderate discoloration noted at fill point. Molded specimens possessed dark streaks due to burning.

*Composition C.*—Slight to moderate discoloration noted at fill point temperature. Molded specimens possessed dark streaks due to burning.

From the data given in the example it is apparent that the only one of the compositions possessing adequate heat stability is Composition A in which both antimony trioxide and pentaerythritol were present. When pentaerythritol is omitted (Composition C), there is a severe loss of stability. Likewise, when pentaerythritol is replaced with Tribase E (Composition B) a lack of stability results.

EXAMPLE 2

Compositions of the formulations given in the following table were prepared by compounding the ingredients specified below:

Table II

| Component | Composition No.—Parts | | | | | |
|---|---|---|---|---|---|---|
| | 1 | 2 | 3 | 4 | 5 | 6 |
| Polyethylene (RSV=2.2—Melt Index=1.0) | 89.2 | 89.2 | 67.8 | 67.8 | 67.8 | 67.8 |
| Chlorinated Paraffin Wax (69.6% combined chlorine) | 10.8 | 10.8 | 10.8 | 10.8 | 10.8 | 10.8 |
| Antimony Trioxide | | | 21.4 | 21.4 | | |
| Pentaerythritol | | 1.75 | | 1.75 | | 1.75 |

The above compositions were compression molded at 200° C. for 2 minutes and at 250° C. for 10 minutes into discs 2¼″ in diameter and ⅛″ thick. All 2-minute discs were of light cream color. In the 10-minute molding, the disc from Composition No. 1 was dark brown; the discs from Compositions Nos. 2 and 6 were tan; the disc from Composition No. 5 was charcoal gray; the disc from Composition No. 3, gray with brown spots; while the disc from Composition No. 4 was a light cream color only slightly darker than the 2-minute discs.

The above results were confirmed by measuring the release of HCl from one gram samples of each 2-minute disc which were placed in test tubes set into a 120–122° C. heating block with a strip of Congo red paper suspended in each tube. The number of minutes required for Congo red paper to turn blue for each composition was as follows:

Composition No.:
1 ---------------------------------------- 15
2 ---------------------------------------- 22
3 ---------------------------------------- 65
4 ---------------------------------------- 115
5 ---------------------------------------- 10
6 ---------------------------------------- 15

It is apparent from the results of the examples that there is a synergistic effect as regards stability between the antimony oxide and pentaerythritol; in other words, antimony oxide contributes not only to flame-proofing properties, as recognized by the art, but also, hitherto unknown to the art, coacts with pentaerythritol to produce a high degree of heat stability.

The previous examples employed polyethylene as illustrative of the polymeric thermoplastic materials that can be rendered flameproof in accordance with the invention. The chemical structure of the polymeric thermoplastic material is not, however, significant in the practice of the invention and there are, accordingly, numerous other polymeric thermoplastic materials which can be employed in the invention in place of polyethylene. For instance, the invention contemplates the flameproofing of polypropylene, natural and synthetic rubber, polystyrene, cellulose acetate butyrate, cellulose propionate, poly(methyl methacrylate), ethyl cellulose, cellulose acetate and like materials which are normally inflammable and hence benefit by the addition of flameproofing materials for certain applications.

The chlorinated paraffin wax employed in the invention should contain between 50–80% of chemically combined chlorine, preferably from 65–75% combined chlorine. The other specified ingredients are used in any grade available in as finely divided form as possible.

It will be appreciated by those skilled in the art that various other materials can be added to the compositions of the invention. Such materials include, for instance, plasticizers, lubricants, dyes and pigments.

In regard to the relative amounts of each of the essential components of the composition, namely, the polymeric thermoplastic material, chlorinated paraffin wax, antimony oxide and pentaerythritol, there is considerable leeway, but generally the following limits are those that have been found practicable. The polymeric thermoplastic material should comprise at lease 50% of the total composition. The chlorinated paraffin wax and antimony oxide together should comprise at least 15% of the total composition with the ratio of chlorinated paraffin to antimony oxide being variable from about 1:3 to 3:1 while pentaerythritol should comprise about 0.1% to 5.0%, more preferably from 1 to 2%, of the total composition. When the percentage of these ingredients does not total 100%, the balance can be comprised of the other materials named above.

The compositions of the invention can be prepared simply by mixing the essential ingredients in any manner known to the art. For instance, compositions can be prepared by milling prior to the molding operation or may be prepared by mixing as an incident to the molding operation such as by extrusion.

The compositions of the invention are capable of use in various types of molding operations, for instance, injection molding, compression molding, extrusion and transfer molding. They are also useful in combination for solvents to make lacquers or surface-coating materials and they may be employed in the manufacture of reinforced or unreinforced films as well as fibers.

What I claim and desire to protect by Letters Patent is:

1. A heat-stable, flameproof composition comprising at least 50% of polyethylene, at least 15% together of antimony oxide and chlorinated paraffin wax having from 50–80% chemically combined chlorine, and at least 0.1% by weight of pentaerythritol, all percentages being based on the total composition.

2. A composition according to claim 1 in which the ratio of chlorinated paraffin to antimony oxide varies from 1:3 to 3:1 and the amount of pentaerythritol is from 1 to 2%.

References Cited in the file of this patent

UNITED STATES PATENTS

| 2,590,211 | Rugar | Mar. 25, 1952 |
| 2,722,557 | Danison | Nov. 1, 1955 |
| 2,830,919 | Schatzel | Apr. 15, 1958 |